Feb. 24, 1953 T. G. NELSON 2,629,317
FRUIT JUICER
Filed Aug. 24, 1946
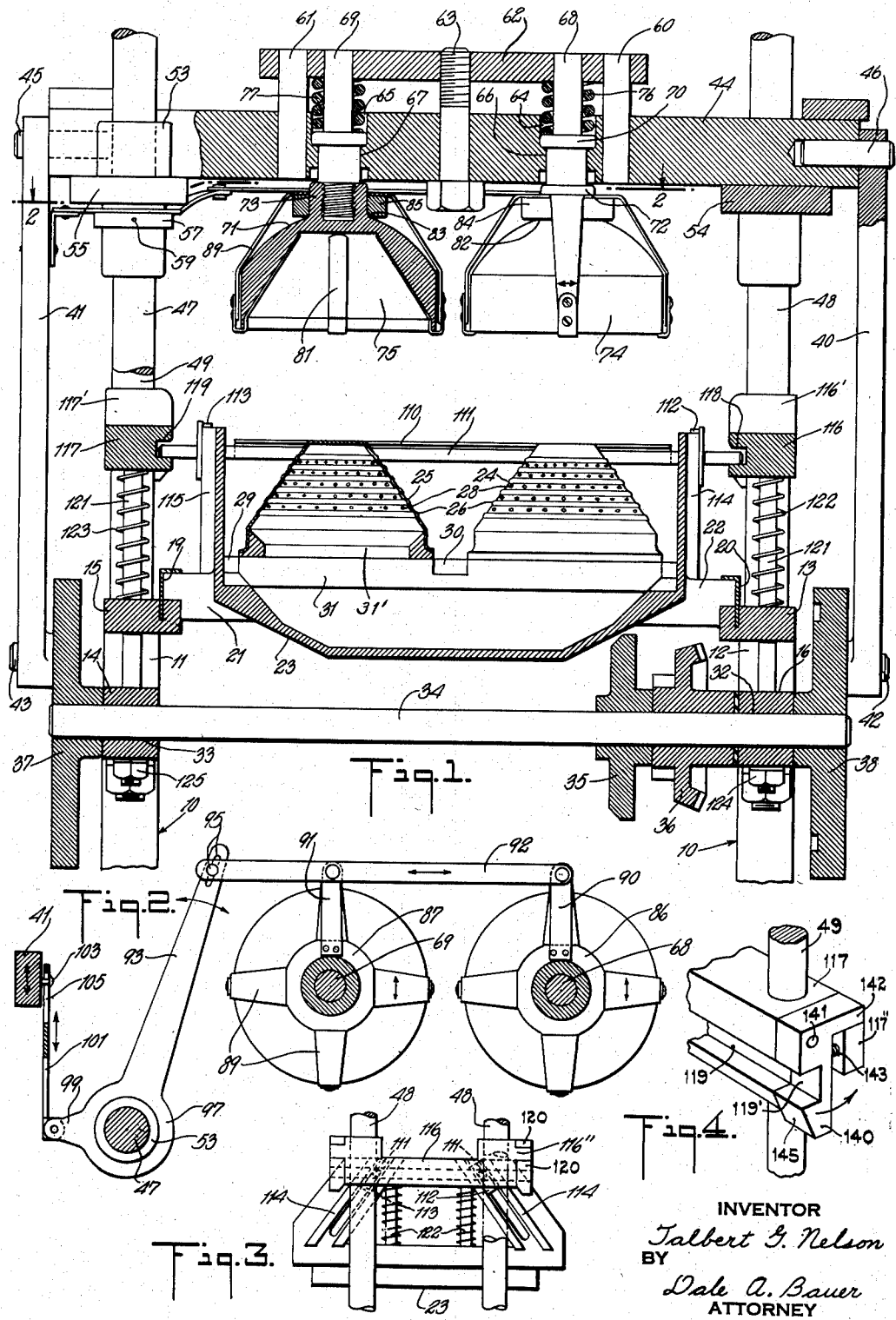
INVENTOR
*Talbert G. Nelson*
BY
*Dale A. Bauer*
ATTORNEY Patented Feb. 24, 1953

2,629,317

UNITED STATES PATENT OFFICE 2,629,317

FRUIT JUICER

Talbert G. Nelson, New York, N. Y.

Application August 24, 1946, Serial No. 692,799

8 Claims. (Cl. 100—208)

This invention relates to a fruit juicer. It will be particularly described with relation to a structure adapted to squeeze oranges, but it is to be understood that this particular description is not a limitation.

The world's favorite appetizer and breakfast fruit is orange juice. This delectable fruit is sold and used in enormous quantities. The majority of all oranges are believed to be squeezed, and the number of oranges that are squeezed by large restaurants in the course of a single day is of great magnitude. It has been shown by observation to require twelve separate operations to squeeze an orange. When the number of operations required to squeeze an orange by means of the usual hand operated squeezer are contemplated in connection with the number of oranges squeezed, it is seen to represent a labor problem of some magnitude. This has been recognized particularly at breakfast time when many people who are in haste are obliged to wait while the waiter suspends all other duties to squeeze the oranges.

Not only is the labor factor of orange juice preparation unsatisfactory in restaurants, but the process is inefficient and unsatisfactory in canning establishments where oranges are squeezed for canning purposes. No machine had yet been devised which will handle oranges in quantities sufficiently large for canning purposes that does not express from the orange skin juices and gases that are dissolved and absorbed in the juice from the pulp and lend to it an objectionable flavor that reduces the sale of such canned juices and tends to impair the storage qualities thereof.

In the preparation of all types of food, human handling is to some extent necessary, but it is to be avoided where there is no real occasion for it. The skill of the cook cannot be dispensed with, both for excellence of result and for psychological reasons, and in any event cooking is itself an operation that makes sanitary things that might otherwise be not so. On the other hand, it is advisable for both psychological and sanitary reasons to avoid human contact with uncooked foods and juices. In the hand squeezing devices and power operated squeezers of the prior art, the skin of the fruit was torn and mutilated and, particularly with power machines, pressed to such an extent that the gas and juice from the skin found its noticeable way into the juice.

An object of this invention is to squeeze oranges in such a manner as to expel the juice from the pulp but not from the skin.

Another object is to squeeze oranges without mutilating the skins.

Another object is to make an orange squeezer that automatically compensates for skins of different thickness, and that will simultaneously squeeze both halves of an orange and automatically compensate for differences in skin thickness between the halves.

Another object is to prevent the squeezing operation from establishing a vacuum between the rind and a frusto conical squeezer element.

Another object of the invention is to automatically dislodge the rinds of squeezed oranges from the frusto conical elements of a squeezer.

The above and further objects and novel features of the invention will be apparent when the same is read in connection with the accompanying drawings. It is to be expressly understood, however, that the drawings are for purposes of illustration only and are not intended as a definition of the limits of the invention, reference for this latter purpose being had primarily to the appended claims.

In the drawings, wherein like reference characters refer to like parts throughout the several views, Fig. 1 is a vertical section through an apparatus embodying principles of the invention;

Fig. 2 is a plan view of the upper squeezer elements showing the mechanism for operating the ejector, the view being taken substantially on line 2—2 of Fig. 1;

Fig. 3 is an end view of the spreading detail for the platform; and

Fig. 4 is a detail view of the snap catch for automatically engaging the rods with the guides.

The base upon which the machine is mounted is not shown, any table or firm support being useful. The number 10 indicates the frame of the machine, which is preferably a casting having at its four corners upright members 11, 12 which are connected by horizontal bars 13, 14, 15, 16. The bars 13, 15 slidably receive the supports 21, 22 that project from trough 23. The detents 19, 20 prevent the trough from being lifted and require it to be withdrawn horizontally.

Within the trough 23 and above the bottom thereof, two frusto conical squeezer elements 24, 25 are firmly supported and removably mounted. These squeezer elements are provided with annular spaced ridges 26 between which are a plurality of holes 28, which permit the juice to pass through the frusto conical element and pour into the trough. The squeezer elements 24, 25 are convex and constitute cooperating members of pairs, the other members of which are concave. The construction of these elements is sturdy in order to withstand long continued use. The support therefor preferably comprises a single bar 31 having an angular top 29 and 30 outside the squeezer elements, and having rings 31' cast, welded, or otherwise fixedly attached thereto, forming the base for the squeezer elements.

The horizontal frame members 14, 15, at about their mid-points, contain bearings 32, 33 in which is journalled a drive shaft 34 which has a driving gear 36 mounted thereupon at an intermediate point, and two disks 37, 38 fixedly secured to its ends. The power that operates the machine is applied through the gear 36. A clutch element 35 is illustrated in connection with this gear, but forms part of a combination that is claimed in my copending application Serial No. 692,800, filed August 24, 1946, and need not be particularly described in connection with this one. The machine described in said copending application cuts the oranges in half and mechanically deposits each half on plates 110 directly above the cone-like elements 24 and 25. The juice falls into the trough 23 and runs out a spout not shown in this drawing but disclosed in said copending application. The juice may be retained in a spoutless trough, if desired, and poured out after removing the trough.

Two connecting rods 40, 41 are pivotally connected at their lower ends to pintles 42, 43 which are eccentrically mounted upon the disks 37, 38. At their upper ends the connecting rods support a beam 44, being pivotally connected thereto by means of pintles 45, 46 mounted in and projecting from the ends of the beam. This beam is adapted to carry the movable squeezer elements and to cooperate in the performance of certain other functions. The beam is guided by four round standards, only three of which are shown, being numbered 47, 48, and 49, respectively. The upper left hand corner of Fig. 1 is not sectioned, being taken in elevation in order to show the top of the near standard on that side, which is omitted from the rest of the figure in order to better disclose the other operative parts. Tubular guides 53 are reciprocable upon the standards, the guides on the left hand side of the machine sliding upon standards 47, 49, and being joined by a cross bar 55 to the mid portion of which the beam 44 is attached. The corresponding bar is indicated in section at the right hand side of the drawing by the number 54. Connection of the beam to the bars may be by welding or in any other suitable and strong manner.

The guides 53 are essentially tubular sleeves to which the ends of the bars 54, 55 are attached and one of which carries a removable collar 57 which is held in fixed position by screws 59 or by any other suitable means. The rotation of the drive shaft 34 turns the disks 37, 38, which transmit reciprocating motion to the beam 44 through the connecting rods 40, 41, thus reciprocating the movable squeezer elements into and out of operative relation to the squeezer elements 24 and 25.

The beam serves as a support for the squeezer elements which are mounted therein in a novel manner which adapts the machine not only to the exhaustion of the juice from the fruit but accommodates it to fruit skins of different thickness. This is also important when halves of the same orange are being squeezed, because it frequently happens that there is a difference in thickness of different parts of the skin of the same orange. In order to accomplish this purpose, a set of pins 60, 61 which may be as numerous as is necessary, are mounted in and project upward from the beam, carrying upon their ends the thrust block 62 which is firmly held in a selected position of adjustment by a screw 63, which projects through the beam. By rotating the screw, which is screw threaded into the thrust block 62, the thrust block can be moved along the length of the pins 60, 61 and thereby be spaced at different distances from the beam.

The beam has apertures 64, 65 that have upper and lower internal shoulders formed by reduced portions 66, 67 of the apertures. Screw threaded supports 68, 69, having flanges such as 70 resting normally upon the upper shoulders of the said apertures, are screw threaded at their lower ends as indicated at 71 for the reception of screw threaded bosses 72, 73 on the concave squeezer elements 74, 75.

Springs 76, 77 bear upon the flanges 70 of the supports 68, 69. These springs are very strong and have a compression value, for instance, between 200 and 300 pounds. This value is calculated in connection with the fruit that is being squeezed, so that it is sufficient at all times, under normal circumstances, to remove the juice completely from the fruit, but without pressing undesirable constituents out of the skins. The upper portions of bosses 72, 73 serve as abutments to limit the upward motion of the supports 69, 68 against the springs. The amount of resilient motion thus permitted to the upper squeezer elements is sufficient to compensate for skins of different thicknesses and allows the several concave elements to work with equal efficiency upon such skins. The strength of the springs can be varied by replacement to accommodate different fruits, the strengths herein indicated being intended for use with oranges.

The concave interior of the squeezer elements 74, 75 is substantially frusto conical, conforming generally to the angle of the elements 24, 25. The pressure face of the upper element 74 is preferably smooth, but may be ribbed as indicated for the lower element 24, if desired. It has heretofore been discovered that the pressures employed tend to expel the air from between the surface of the element 74 and surface of the skin, so that a kind of vacuum is set up, making it difficult to eject the skin from said element. This invention overcomes this difficulty in two ways. In the first place, flat fingers 81, preferably having relatively square edges, are provided within the elements 74 and 75 so that air may follow the edge of the finger after pressing, and break the vacuum between the skin and the element. In the second place, these fingers are made movable with respect to the faces of the elements 74 and 75 so that the rind may be ejected.

The outer surface of the squeezer elements 74, 75 is provided with annular shoulders 82, 83, located at about the base of the screw threaded bosses 72, 73, upon which rest collars 84, 85 which may be turned upon the shoulders. Fixedly attached to those collars are spiders 86, 87 having arms 89 which are bent upwardly within the elements 74, 75 and preferably bearing upon the face thereof. Arms 90, 91 are connected to the spiders 86, 87 and at their ends to a metal strap 92, to the end of which is connected a lever 93 by means of a slot and pin connection 95. The lever 93 has an annular portion 97 which encircles the tubular guide 53 and is supported by the collar 57. The other end of the lever 99 is connected by a flat bar 101 to a pin 103 carried by the connecting rod 41. In Fig. 2, the end of the bar 101 is sectioned in order to show a slot 105 within which the pin 103 moves. The pin is operative to throw the bar 101 and the lever 93 only at the end of the horizontal stroke of the connecting rod 41. This connecting rod has a vertical and a horizontal component of motion and it is by means of its horizontal component of motion that the fingers 81 are moved within the elements 74, 75. This motion ejects the skins after the pressing has taken place and returns the fingers to their original position before the elements 74, 75 engage the next pieces of fruit.

It will therefore be seen that the apparatus as thus far described moves a beam in which is supported one of a pair of frusto-conical squeezers into and out of operative relation to its fixed counterpart, compensates for differences in the skin thickness of fruits, prevents the formation of vacuum between the skin of the fruit and the concave member, ejects fruit skins from the concave member, and permits the pressure applied to be varied to accommodate different sorts of fruit. Thus, one spring pressure might be used for oranges, and a different pressure for lemons, while in operating upon fruits having thin and tough skins, the pressure might be considerably greater than that employed in operating upon pulpy skinned fruit containing considerable quantities of protective chemicals.

In order to support the fruit, the squeezer elements 24, 25 are provided with flat tops, but the size of such tops is of necessity limited if the squeezing operation is to be satisfactorily performed. In a machine such as herein described, which is substantially fully automatic, it is advisable that means be provided that make it unnecessary to balance the fruit halves upon the flat tops of the squeezer elements. To accomplish this, there is provided a split platform 110 which in its uppermost position forms, in effect, a continuation of the flat tops of the squeezer elements. This platform has aligned semi-circular cut out portions developed to conform to the shape of the outside of the convex squeezer elements. As the platform descends those cut out portions maintain a minimum clearance from the squeezer element wall, so that as the platform ascends it strips the skins from the cones and lifts them into position for ejection. In Fig. 1 only one of these platform members is shown, the other one being on the near side of the plane on which the section is taken. These platform members are supported on rods 111 which are carried in sliders 112, 113 which are slidably mounted in inclined guides 114, 115 which are formed in the sides of the trough. The guides are inclined at an angle substantially equal to the angle of the squeezer element wall so that the edge of the guide in proximity to the said wall will, when displaced, move down the side of the squeezer element and away from the cooperating platform member.

The platform members would fall to the bottom of the slots if means were not provided to support them in elevated position. A pair of supports comprising beams 116, 117 are mounted for vertical sliding movement upon the standards 47, 48, 49, and are provided with horizontal grooves 118, 119 which receive the ends of the supporting rods 111. Bolts 121 are fixedly mounted in members 116, 117 but pass movably through supports 13, 15 and frame members 16, 14. Springs 122, 123 keep the supports 116, 117 in normally elevated position. Nuts 124, 125 on the ends of bolts 121 prevent the springs from dismounting the supporting rods 111.

It is desirable that the trough 23, the squeezer elements 24 and 25, and the platform members 110 should be withdrawn as a unit for cleansing. To this end the beams 116 and 117 are provided at each end with a pivoted cam or snap catch, one of which is shown in Fig. 4. In the upper position of the beams 116 and 117 the rods 111 are held by the guides 114 and 115. At the ends of the beams are pivoted cam members 140. The cam members are mounted on projecting pintles 141 carried by the ends of the beams 116, 117 and have extensions 142 that normally rest, under the thrust of spring 143, upon the top of extensions 116'—117' of the beams. When the rods are to be disengaged the beams are lowered until the rod ends are in the grooves of catches 140 and are freed by moving the snap catches back against the compression of springs 143. The beams are then raised to neutral position and the unit may be removed.

When the unit is replaced in its supports 13 and 15, the machine may be started and the snap catches will ride over the ends of the rods 111 on cams 145 until they enter the grooves and are picked up and carried into the cycle.

When the beam 44 brings the squeezer elements 74, 75 downward, the lower ends of the guides 53 engage projections 116', 117' preferably just before the squeezing action applies any substantial pressure to the platform 110, the said platform being thus moved out of the way of the upper squeezing element as the squeezing progresses. The ends of rods 111 are guided outwardly in parallel to the walls of the squeezer element by the guides 114, 115, a motion which is permitted by the horizontal slots 118, 119. The platform members consequently remain at all times in a position adapted to support the fruit in its proper relation to the squeezing elements so that any tendency of the fruit to become dislodged is prevented and complete expulsion of the juice from the fruit is accomplished without rending the skins thereof. If, as sometimes occurs, the fruit remains upon the lower squeezer element, the platform members elevate it as soon as the upper squeezer elements are withdrawn. There is thus provided in this machine means to dislodge fruit from the convex and from the concave squeezer elements.

An advantage of this invention is in the provision of an orange squeezer having concave and convex squeezer elements, each of which is provided with automatic means for dislodging fruit skins.

Another advantage of the invention is in the provision of a fruit juicer having means for positioning the fruit halves between squeezer elements, and means for the support of the fruit in proper relation to the squeezer before and during the squeezing.

Another advantage is in preventing the formation of vacuum between the fruit rinds and squeezer elements.

Another advantage is in the automatic proportioning of the squeezing effort so that the juices are removed from the pulp of the fruit but not from the rind.

Another advantage is in the provision of means for varying the squeezing effort.

Yet another advantage is in automatic apparatus capable of handling fruit of different skin thickness in sequence or together.

A particular advantage is in the removable receptacle and squeezer unit, which is trough shaped, contains the lower cones and is removable as a unit for cleaning. The design of this unit is particularly adapted to cleaning by dish washing machines of water spray type.

Still another advantage is in the accomplishment of a complex series of coordinated functions without the employment of many parts that require machining to close tolerances.

Another advantage of the invention is particularly in the simple and effective method of dislodging skins from the concave squeezer elements, which is made to operate efficiently at precise times in relation to other operations by means of a simple lost motion connection.

Although only a single embodiment of the present invention is herein illustrated and described, it is to be expressly understood that the invention is not limited thereto. Various changes may be made in the construction of the parts and in the materials used without departing from the spirit and scope of the invention, as will now be apparent to persons skilled in the art. For a definition of the limits of the invention, reference is had primarily to the appended claims.

What is claimed is:

1. A fruit juicer comprising in cooperative combination a squeezer element having an imperforate concave face adapted to engage the fruit, means comprising blades operable upon said face to dislodge material therefrom, means for movably mounting said blades on said element externally thereof, and means to operate said blades between squeezings.

2. A fruit juicer comprising in cooperative combination a squeezer element having a face adapted to engage the fruit, means comprising blades operable upon said face to dislodge material therefrom, and means to operate said blades between squeezings including a movable support carrying said element, an external sleeve about a part of the said element connected to said blades, and means to pivotally reciprocate the sleeve including means to reciprocate the movable support.

3. In a fruit juicer a concave pressure member having an imperforate concave surface to engage the fruit, and means to prevent the establishment of a vacuum between the skin of the compressed fruit and the pressure member comprising fingers mounted externally of said member and extending thereinto across the edge of the pressure member, said fingers being constructed and arranged to provide a channel for the entry of air to break the vacuum between squeezed fruit rind and pressure member.

4. A fruit juicer comprising cooperating convex and concave members adapted to express the juice from fruit by pressure, said concave member having an internal imperforate surface engageable with the fruit, means to dislodge the fruit skin from within the concave member comprising a finger movable about the concavity thereof and extending outward beyond the edge of the rind, and means connected to the outward extension of said finger for movably supporting the same.

5. A fruit juicer comprising a pair of convex pressure members and a pair of cooperating concave pressure members adapted to squeeze fruit between them by relative reciprocating motion, movable spring pressed supports for one pair of said members, means to move said supports to bring the said members into squeezing position, metal fingers pivotally mounted on said concave members and projecting within the said concave members, and motion transmitting means operably connected to the means to move the support and to the metal fingers, and including lost motion means immobilizing the fingers during squeezing.

6. A fruit juicer comprising a pair of stationary squeezer elements, a pair of cooperating movable squeezer elements adapted to press the fruit against the stationary elements, a movable beam having apertures, spring pressed supports for some of the squeezer elements movably mounted in the apertures, means to support the beam movably, power driven means to move the beam and the movable squeezer elements into and out of squeezing position, flat metal fingers pivotally mounted externally of and projecting within some of said squeezer elements, a pivoted lever mounted for movement with said beam and operatively connected to the movable fingers, and means operable by and connected to said power driven means to move the lever and the fingers within the squeezer elements at the end of each pressure stroke.

7. A fruit juicer comprising a pair of stationary squeezer elements, a pair of cooperating movable squeezer elements adapted to press the fruit against the stationary elements, a movable beam having apertures, supports for some of the squeezer elements movably mounted in the apertures, springs bearing upon the supports whereby to adapt the squeezer elements to fruit skins of different thickness, means to support the beam movably, power driven discs, connecting rods pivoted to the discs and to the beam whereby to move the movable squeezer elements into and out of squeezing position, flat metal fingers pivotally mounted upon and projecting within some of the squeezer elements, a pivoted lever mounted for movement with said beam and operatively connected to the movable fingers, and a lost motion connection between one of said connecting rods and said lever whereby the fingers are moved within the squeezer elements at the end of each pressure stroke to dislodge fruit skins therefrom.

8. A fruit juicer comprising a pair of stationary squeezer elements, a pair of cooperating movable squeezer elements adapted to press the fruit against the stationary elements, a beam having apertures, a thrust block mounted on and spaced from the beam, supports for some of the squeezer elements movably mounted in the apertures, springs bearing upon said block and supports, said springs being adapted to yield sufficiently to allow the squeezer elements to accommodate fruit skins of different thickness, guides for the beam, a power shaft having discs at its ends, connecting rods pivoted to the discs and beam whereby to move the movable squeezer elements into and out of squeezing position, a collar rotatably mounted on the outside of each movable squeezer element, flat metal fingers mounted upon the collars and projecting within the movable squeezer elements, and a lever pivotally mounted upon a guide and operatively connected to the movable fingers, said lever having a lost motion connection to one of said connecting rods whereby the fingers are moved within the squeezer elements at the end of each pressure stroke to dislodge the fruit skins.

TALBERT G. NELSON.

REFERENCES CITED

The following references are of record in the file of this patent:

UNITED STATES PATENTS

| Number | Name | Date |
|---|---|---|
| 968,344 | Hackney | Aug. 23, 1910 |
| 1,112,802 | Jager et al. | Oct. 6, 1914 |
| 1,661,374 | Lacey | Mar. 6, 1928 |
| 1,700,765 | Kaster | Feb. 5, 1929 |
| 1,842,709 | Baughman | Jan. 26, 1932 |
| 1,888,529 | Faulds | Nov. 22, 1932 |
| 2,245,726 | Seyfried | June 17, 1941 |
| 2,311,565 | Nelson | Feb. 16, 1943 |